United States Patent
Taga

[11] Patent Number: 5,131,806
[45] Date of Patent: Jul. 21, 1992

[54] PUMP

[75] Inventor: Jun Taga, Kawasaki, Japan

[73] Assignee: Mitsui & Co., Ltd., Tokyo, Japan; a part interest

[21] Appl. No.: 593,332

[22] Filed: Oct. 1, 1990

Related U.S. Application Data

[63] Continuation of Ser. No. 165,109, filed as PCT/JP87/00675, Sep. 11, 1987, abandoned.

[30] Foreign Application Priority Data

May 29, 1987 [JP] Japan ................... 61-134170
Sep. 30, 1987 [JP] Japan ................... 61-231992

[51] Int. Cl.[5] ................. F04D 29/00; F04D 13/00
[52] U.S. Cl. ................. 415/112; 415/168.1; 415/169.2
[58] Field of Search ............... 415/110, 111, 112, 113, 415/176, 170 A, 168.3, 168.2, 168.1, 169.2; 384/322, 291; 417/366, 369, 372

[56] References Cited

U.S. PATENT DOCUMENTS

| | | | |
|---|---|---|---|
| 547,012 | 10/1895 | Hardy | 92/86.5 |
| 1,285,644 | 11/1918 | Doble et al. | 415/112 |
| 1,483,143 | 2/1924 | Whitlock | 92/86.5 |
| 1,651,881 | 12/1927 | Frickey et al. | 415/112 |
| 2,330,781 | 9/1943 | Langmyhr et al. | 92/86.5 |
| 2,913,989 | 11/1959 | Boardman et al. | 415/112 |
| 3,128,713 | 4/1964 | Nechine | 415/112 |
| 3,186,513 | 6/1965 | Dunn et al. | 415/176 X |
| 3,229,900 | 1/1966 | McCrory et al. | 92/86.5 |
| 3,257,957 | 6/1966 | Tracy | 415/112 |
| 3,401,640 | 9/1968 | Fowler et al. | 415/112 |
| 3,495,544 | 2/1970 | Enssle | 417/568 |
| 3,532,444 | 10/1971 | Strub | 415/112 X |
| 3,572,976 | 3/1971 | Sato | 415/112 X |
| 3,655,295 | 4/1972 | Mitchell | 415/112 |
| 3,728,857 | 4/1973 | Nichols | 415/168.3 |
| 3,742,822 | 7/1973 | Talbert | 92/86 |
| 3,943,717 | 3/1976 | Schexnayder | 92/86 |
| 4,264,452 | 4/1981 | Chen | 415/112 X |
| 4,684,329 | 8/1987 | Hashimoto | 417/366 |
| 4,776,260 | 10/1988 | Vincze | 92/86 |

FOREIGN PATENT DOCUMENTS

| | | | |
|---|---|---|---|
| 714290 | 11/1941 | Fed. Rep. of Germany | 415/111 |
| 1123075 | 9/1955 | Fed. Rep. of Germany | 92/86 |
| 1528547 | 7/1965 | Fed. Rep. of Germany | 417/437 |
| 3502538 | 8/1985 | Fed. Rep. of Germany | 92/86 |
| 2385912 | 10/1978 | France | 417/437 |
| 287584 | 4/1935 | Italy | 384/322 |
| 4321328 | 9/1965 | Japan | 415/110 |
| 41-8083 | 4/1966 | Japan . | |
| 46-6024 | 2/1971 | Japan . | |
| 52-155406 | 12/1977 | Japan . | |
| 58-8295 | 1/1983 | Japan | 415/112 |
| 62-159795 | 7/1987 | Japan . | |
| 51-140203 | 12/1987 | Japan . | |
| 641153 | 1/1979 | U.S.S.R. | 92/86.5 |
| 1021823 | 6/1983 | U.S.S.R. | 415/112 |
| 685455 | 1/1953 | United Kingdom | 415/112 |

Primary Examiner—Edward W. Look
Assistant Examiner—Hoang Nguyen
Attorney, Agent, or Firm—Kramer, Brufsky & Cifelli

[57] ABSTRACT

The present invention provides a pump which is capable of supplying a liquid free from worn materials and other impurities resulting from pump operation. In one embodiment, the pump includes a diverting passageway for diverting flow liquid from the main discharge opening to a gap between a cylinder and a shaft, between an impeller and a bearing and also includes a passageway for discharging the diverted flow liquid containing the worn materials from the gap during operation of the pump in which the main flow liquid is suctioned into the cavity of the pump and discharged through a main discharge opening.

6 Claims, 7 Drawing Sheets

PUMP

This application is a continuation of application Ser. No. 165,109, filed as PCT/JP87/00675, Sep. 11, 1987, now abandoned.

TECHNICAL FIELD

This invention relates to a rotary pump which is used for ultrapure water, strong acid and strong alkali in which any contaminants occurring from slidable means disposed in the pump is prevented from being mixed with a liquid to be supplied by the pump.

BACKGROUND ART

Figure 5:
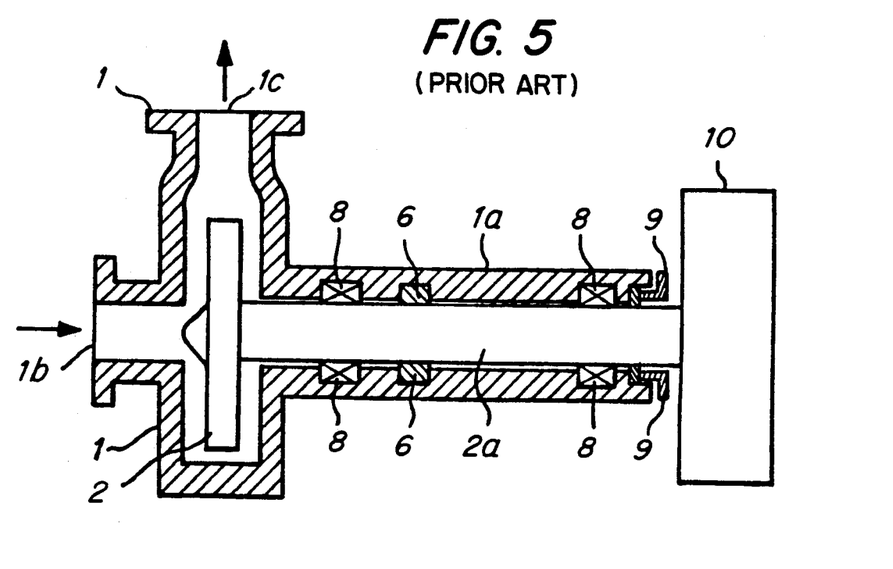
FIG. 5 is a section view of a conventional rotary pump.

In FIG. 5, there is shown an example of a conventional rotary pump which is used for an ultrapure water pipe line in the process of manufacturing semiconductors.

Numeral 1 is a casing comprising a sucking opening 1b for sucking a main flow liquid as ultrapure water and a discharge or suction opening 1c for discharging it. Numeral 2 is an impeller which is incorporated in the casing 1.

The impeller 2 performs the function of supplying the main flow liquid from the sucking opening 1b to the discharge opening 1c. A shaft 2a of the impeller 2 is secured in a cylinder 1a of the casing 1.

Numeral 6 is an annular seal member disposed between the inner surface of the cylinder 1a and the outer surface of the shaft 2a. Numeral 8 is an annular bearing disposed also between the former and the latter. Both the seal member 6 and the bearing 8 are the slidable means which are slidable on the shaft 2a of the impeller 2.

Numeral 9 is a ground seal member fixed on an end of the cylinder 1a. Numeral 10 is a motor which is combined with the shaft 2a to rotate the impeller 2.

Under such circumstances, as soon as the motor 10 is driven, the impeller 2 is rotated, thereby the main flow liquid is sucked through the sucking opening 1b and discharged from the discharge opening 1c.

On the other hand, the liquid is inclined to axially flow into a slight gap between the shaft 2a and the cylinder 1a, but its further flow is prevented by the seal member 6. As long as the pump is driven, the liquid is circulating within the casing 1 before the seal member 6.

Since the shaft 2a of the impeller 2 is rotated slidably on both the bearing 8 and the seal member 6, a slight amount of impurities or contaminants, i.e. worn matters occur from the bearing 8 and the seal member 6 respectively. The slight amount of impurities are mixed with the liquid in the interior of the casing 1. Thus, the liquid which should be ultrapure is contaminated.

For example, the purifying water to be used in the processes of manufacturing semiconductors must be of a very high purity to prevent such impurities from being adhered to the semiconductors and increase the performance of respective semiconductor products. Thus, the ultrapure water is used in the semiconductor industry.

According to such a conventional pump, the impurities that occur from the slidable portions are mixed with the ultrapure water which passes through the interior of the casing of the pump. Thus, it is contaminated by the impurities, so that the yield of the semiconductor products is reduced greatly. According to this invention, the term "impurities" means contaminants.

DISCLOSURE OF THE INVENTION

This invention provides a pump, in which e.g. an ultrapure liquid flowing in the interior of the rotary pump can be supplied to a given place without mixing with any impurities occurring from slidable means of the pump, thereby maintaining its purity continuously.

More specifically, the pump according to this invention comprises an impeller having a shaft; a casing incorporating therewithin the impeller, a sucking opening for sucking a main flow liquid e.g. ultrapure water and a discharge opening for discharging the main flow liquid; and a cylinder integrally associated with the casing; wherein an intercepting stream to intercept the impurities occurring from slidable means such as a bearing in the cylinder is formed in a slight gap between the casing and the slidable means, and the intercepting stream is derived from the main flow liquid. As a result, the main flow liquid flowing in the interior of the casing is prevented from being mixed with the impurities.

BEST MODE FOR CARRYING OUT THE INVENTION

A first embodiment of this invention will now be described with reference to FIGS. 1A and 1B.

Since the same construction as the conventional example in FIG. 5 has the same numerals, its description will be omitted.

Figure 1A:
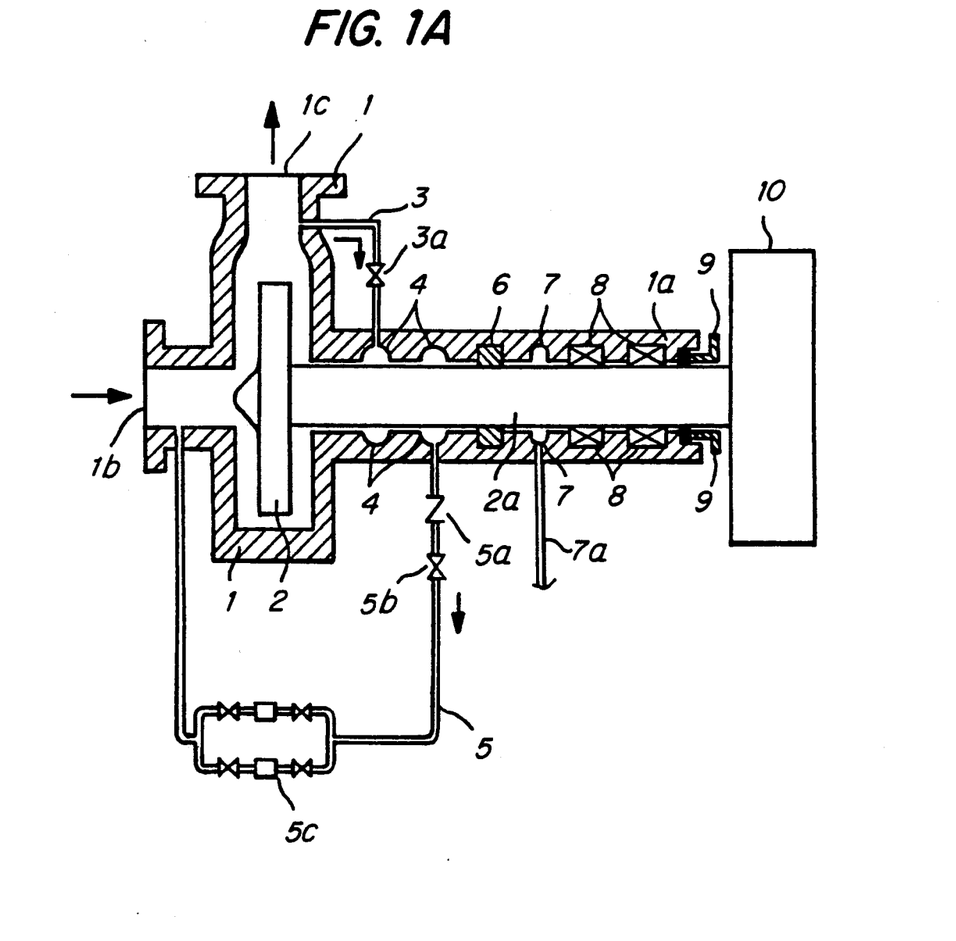
FIG. 1A is a section view according to a first embodiment of this invention.

FIG. 1A shows a vertical section view of the first embodiment of this invention.

Numeral 3 is a divergent pipe of which one end is communicated with a flow passage adjacent to the discharge opening 1c of the casing 1. The other end of the divergent pipe 3 is communicated with an annular manifold groove 4 which is formed on the inner surface of the cylinder 1a. The divergent pipe 3 as a divergent passage is, at its preferred position, provided with a needle valve 3a.

In this embodiment, the annular manifold grooves 4, 4 are disposed in two rows between the impeller 2 and the annular seal member 6. However, a single annular manifold groove 4 will also be sufficient.

Numeral 5 is a discharge pipe (as a discharge passage) of which one end is communicated with the annular manifold groove 4. The other end of the discharge pipe 5 is communicated with the sucking opening 1b of the casing 1. The discharge pipe 5 is, at its preferred position, provided with a non-return valve 5a, a needle valve 5b and a filter means 5c respectively. The filter means 5c comprises two filter units and a plurality of needle valves.

Numeral 7 is an annular discharge groove which is formed on the inner surface of the cylinder 1a and positioned between the seal member 6 and the bearing 8. The discharge groove 7 comprises a pipe 7a for discharging a contaminated liquid.

A function of this embodiment will now be described.

When the motor 10 is driven and the impeller 2 starts rotation, a main flow liquid as ultrapure water is sucked through the sucking opening 1b and discharged from the discharge opening 1c, in the proximity of which the pressure of the main flow liquid is increased. On the other hand, a part of the main flow liquid is supplied into the manifold groove 4 by way of the divergent pipe 3 and then into the discharge pipe 5. Subsequently, the main flow liquid flowing in the discharge pipe 5 passes through the filter 5c and is returned to a main flow passage adjacent to the sucking opening 1b.

Since the liquid flowing in the manifold groove 4 comes from the area adjacent to the discharge opening 1c, a certain pumping pressure is applied to the liquid. Thus, the liquid flows into the manifold groove 4 through the divergent pipe 3 and into a slight gap between the shaft 2a and the cylinder 1a. Subsequently, a part of the liquid flows to a leftside of the cylinder 1a (in FIG. 1A), while the other part thereof flows to a rightside of it.

Such arrangement prevents entirely any impurities occurring on the seal member 6 and the bearing 8 from being mixed with the liquid.

More specifically, the main flow liquid flowing in an intercepting flow passage comprising the divergent pipe 3, the manifold groove 4 and the discharge pipe 5 forms an intercepting stream for intercepting any impurities that occur from the slidable means i.e. the seal member 6 and the bearing 8 as a result of sliding with the shaft 2a.

On the other hand, the impurities i.e. worn matters that occur from the seal member 6 and the bearing 8 are completely discharged outside the casing 1 by way of the discharge groove 7 and its discharge pipe 7a. Therefore, the impurities i.e. worn matters that occur from the seal member 6 and the bearing 8 are completely prevented from being mixed with the liquid flowing in the interior of the casing 1.

Figure 1B:
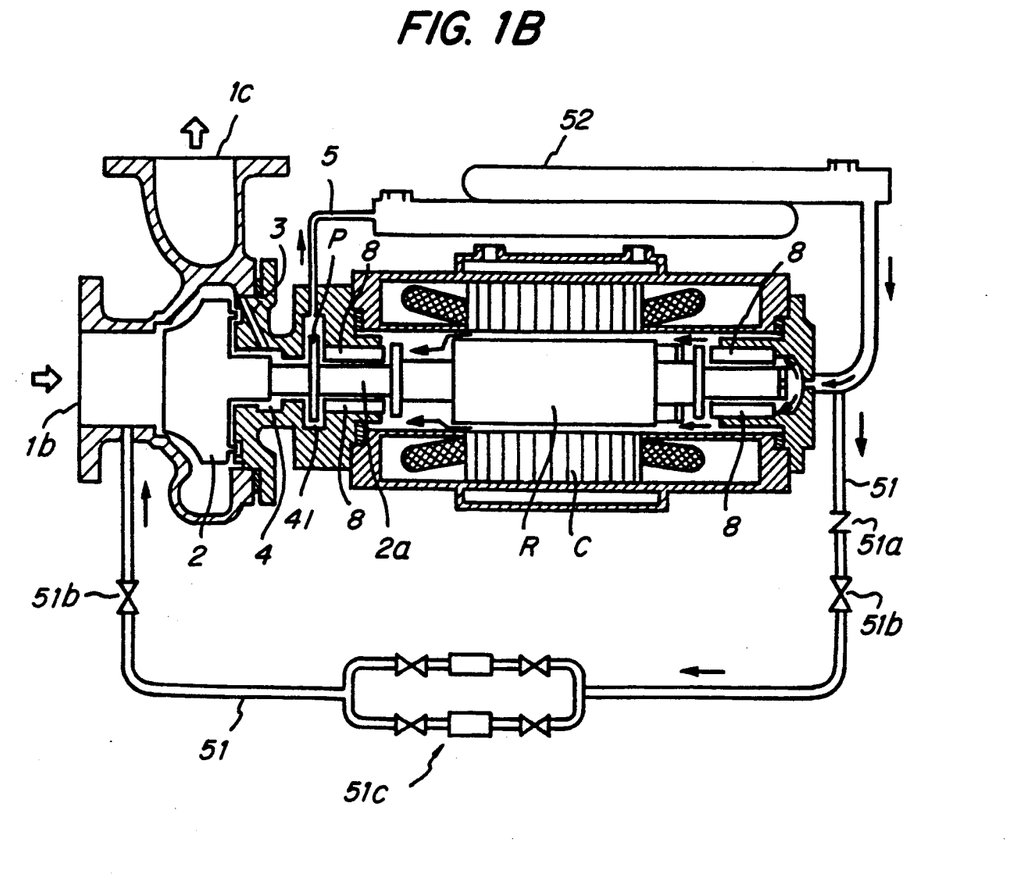
FIG. 1B is a section view of an example, in which the first embodiment is applied to a canned motor pump.

FIG. 1B shows an example, in which the first embodiment is applied to a canned motor pump.

In FIG. 1B, there are shown a rotor R, a coil C and a subpump P which is disposed in a second manifold groove 41 before the shaft 2a of the rotor R.

A divergent passage 3 is obliquely disposed between the discharge opening 1c and a first manifold groove 4. The discharge pipe 5 is effective to discharge a diverged liquid from the second manifold groove 41 adjacent to the first manifold groove 4. The discharge pipe 5 comprises a cooler 52 for preventing heating of the bearing 8 and the rotor R. A cooling medium of the cooler 52 is e.g. the main flow liquid or the like.

As shown in FIG. 1B, the discharge pipe 5 connects the second discharge pipe 51 to a rear part of the motor. A part of the diverged liquid is returned to the main flow passage adjacent to the sucking opening 1b by way of the second discharge pipe 51. Numeral 51c is a filter, numeral 51a is a non-return valve and numeral 51b is a needle valve.

A function of the second embodiment will be described.

When power is switched on, a high pressure main flow liquid at the side of the discharge opening 1c flows into the first and second manifold pipes 4, 41 by way of the divergent passage 3 and then is supplied to the rear part of the motor by way of the discharge pipe 5. A part of the diverged liquid is supplied in a leftside direction as shown by arrows through the bearing 8 (a leftside one in FIG. 1B) due to the actuation of the subpump P. Then, the rotor R and other related components are cooled by the liquid.

After the diverged liquid passes through a front bearing 8, it is returned to the second manifold 41 and then to the discharge pipe 5. The reason why the diverged liquid returned to the second manifold groove 41 through the front bearing 8 is prevented from flowing into the first manifold groove 4 and the divergent passage 3 and consequently from being mixed with the liquid flowing in the interior of the casing 1 is due to that a pressure of the liquid within the divergent passage 3 and the first manifold groove 4 is higher than that of the diverged liquid returned to the second manifold groove 41 due to circulation.

Thus, the liquid flowing into the divergent passage 3 and the first manifold groove 4 forms an intercepting stream for intercepting any impurities occurring from the bearings 8 as a result of sliding with the shaft 2a. Therefore, the impurities i.e. worn matters occurring therefrom are entirely prevented from being mixed with the liquid flowing in the interior of the casing 1.

On the other hand, the diverged liquid is circulated in a so-called closed circuit comprising the discharge pipe 5, the rotor R, the bearings 8 and the second manifold groove 41. Thus, there is growing the disadvantage that the concentration of the impurities mixed with the diverged liquid is increased. To eliminate such disadvantage, the second discharge pipe 51 is connected to the discharge pipe 5, thereby the diverged liquid is filtered by the filter 51c disposed in the discharge pipe 51 and then returned to the interior of the casing 1.

Under such construction, the ultrapure liquid can flow from the sucking opening 1b to the discharge opening 1c with no mixing of any impurities.

A second embodiment of this invention will be described with reference to FIG. 2.

Figure 2:
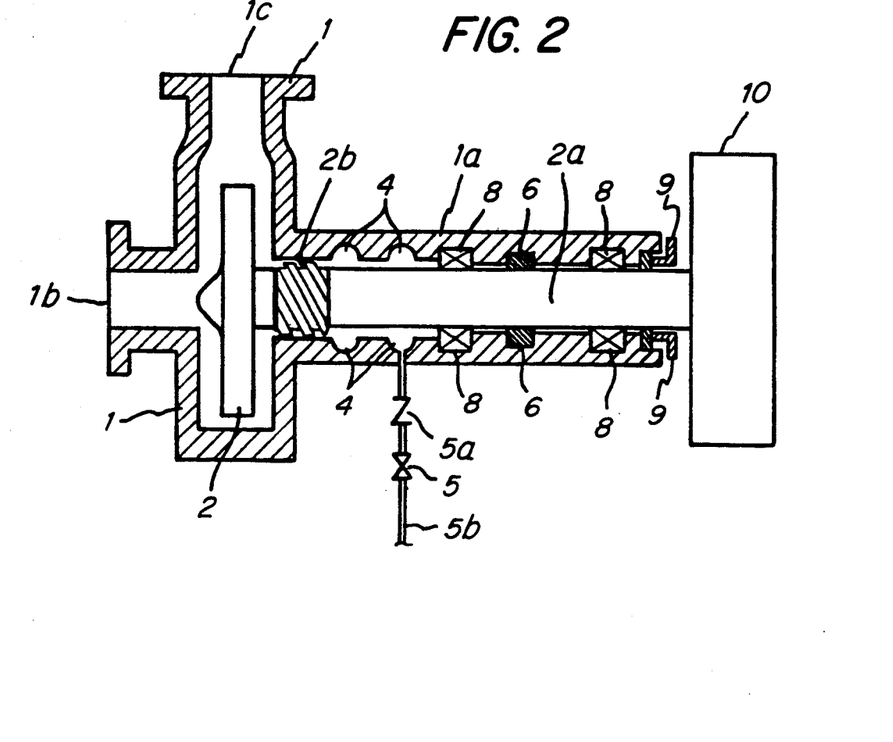
FIG. 2 is a section view according to a second embodiment of this invention.

In FIG. 2, numeral 2b is a screw thread portion which is formed on the shaft 2a and behind the impeller 2. The intercepting stream passage for intercepting the impurities is composed of the screw thread portion 2b, the manifold groove 4 and the discharge pipe 5. When the motor 10 is driven and the impeller 2 starts rotation, the main flow liquid is sucked through the sucking opening 1b and discharged from the discharge opening 1c under a pressure application.

On the other hand, due to the rotation of the screw thread portion 2b, a part of the liquid is supplied into the slight gap between the inner surface of the cylinder 1a and the outer surface of the shaft 2a, and then into the manifold groove 4. Subsequently, it flows into the discharge pipe 5 and is returned to the main flow passage adjacent to the sucking opening 1b by way of the filter (not illustrated) mounted in the discharge pipe 5.

A third embodiment of this invention will now be described with reference to FIGS. 3A, 3B, 3C and 3D. This embodiment shows a canned motor pump.

Figure 3A:
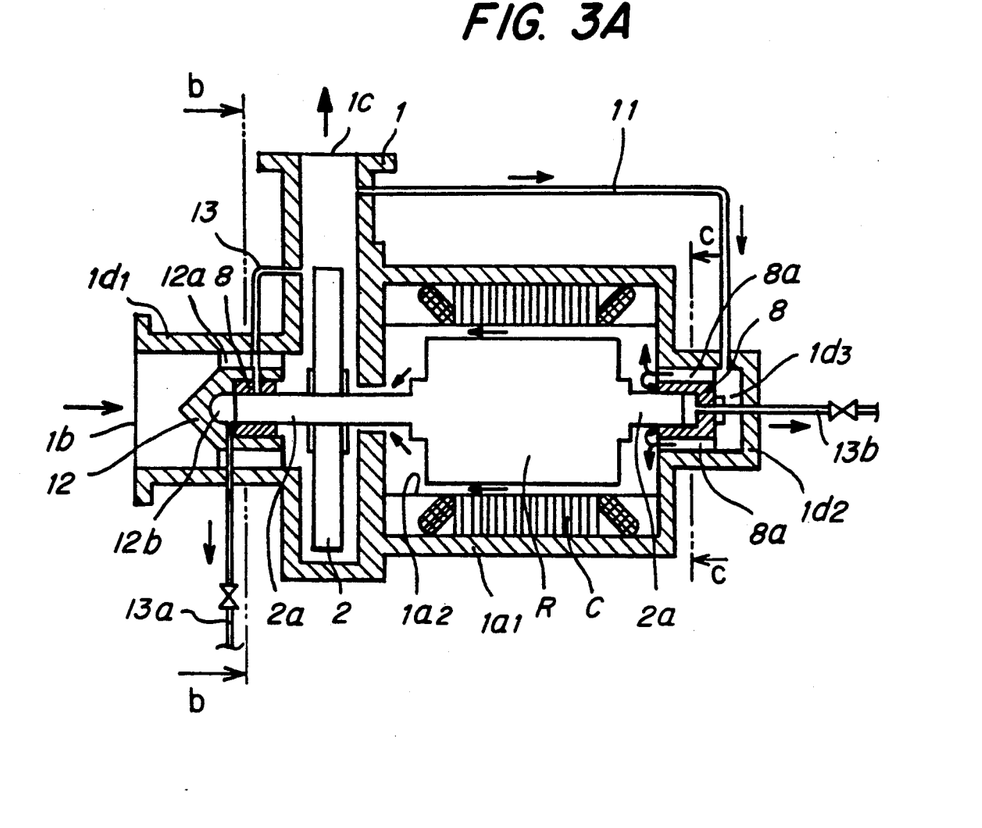
FIG. 3A is a section view according to a third embodiment of this invention.
Figure 3B:
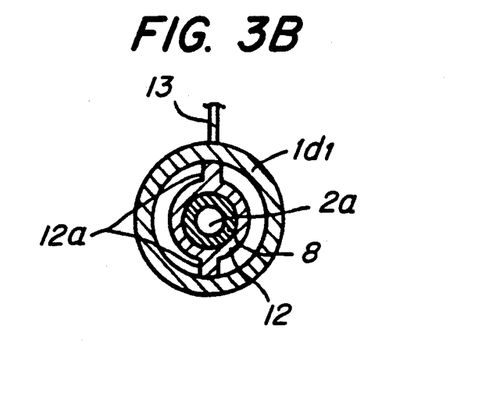
FIG. 3B is a section view taken along line b—b in FIG. 3A.

In FIG. 3A, numeral 1d1 is a front casing integrally associated with the casing 1. Numeral 12 is a coupling which is coupled with a front end of the shaft 2a of the impeller 2 and mounted on the bearing 8. The coupling 12 comprises a leg 12a which is formed on an outer surface of the coupling 12.

Figure 3C:
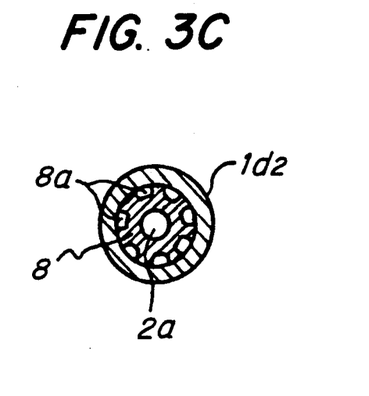
FIG. 3C is a section view taken along line c—c in FIG. 3A.
Figure 3D:
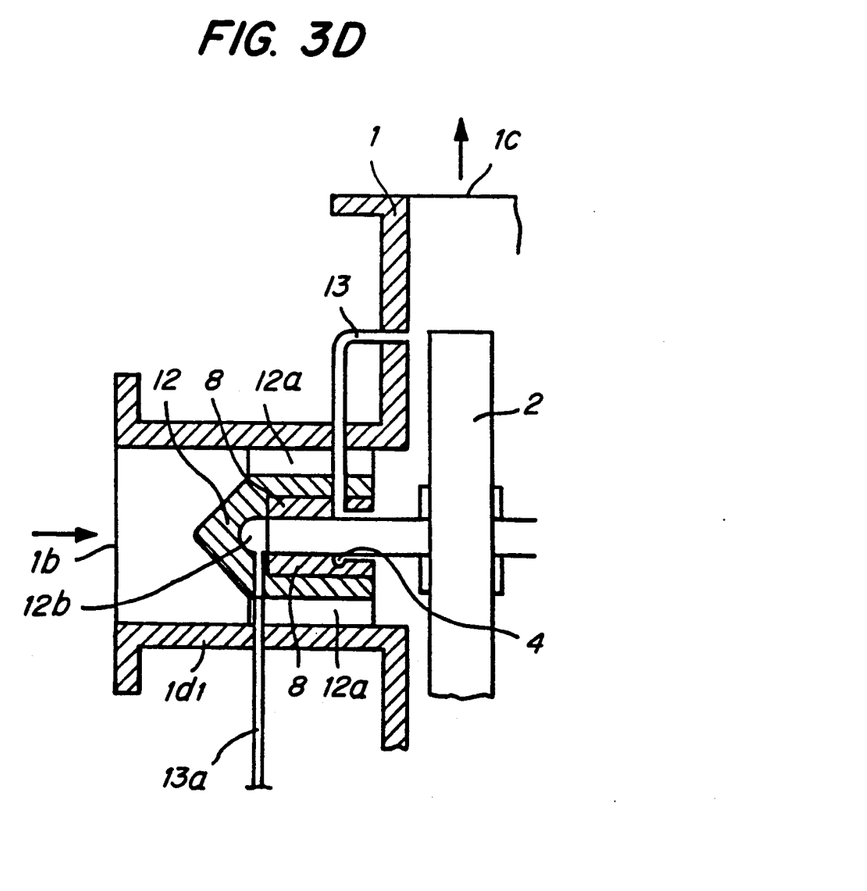
FIG. 3D is an enlarged section view of a front part in FIG. 3A.

As clearly shown in FIG. 3D, numeral 13 is a divergent pipe as a divergent passage which connects the interior of the casing 1 to the bearing 8. The divergent pipe 13 penetrates into the coupling 12 and the leg 12a respectively, and is open for the manifold groove 4 formed on the inner surface of the bearing 8.

Numeral 13a is a discharge pipe as a discharge passage which penetrates through the coupling 12, the leg 12a and the front casing 1d1 and is communicated with the concave portion 12b of the coupling 12. Numeral 1d2 (in FIG. 3A) is a rear casing which supports a rear part of the shaft 2a by way of the bearing 8 and connects a flow passage adjacent to the discharge opening 1c by way of a divergent pipe 11 as a divergent passage.

As shown in FIG. 3C, the bearing 8 is slidably mounted on the shaft 2a, and comprises a plurality of grooves 8a formed axially upon the outer surface thereof.

Numeral 13b is a discharge pipe extending from a rear end of the bearing through the rear casing 1d2. Numeral 1a1 is a motor casing and numeral 1a2 is a rotor casing.

When the motor is driven and the impeller 2 starts rotation, the main flow liquid is sucked through the sucking opening 1b and discharged from the discharge opening 1c under a pressure application.

On the other hand, a part of the liquid is supplied into the divergent pipe 13 and into the manifold groove 4 of the front bearing 8. Then, a further part of it flows to the interior of the casing 1, while the other part of it passes through the bearing 8 and then is mixed with the impurities i.e. worn matters occurring from the bearing 8. Subsequently, it is discharged from the discharge pipe 13a through the concave portion 12b of the coupling 12. The contaminated liquid flowing in the discharge pipe 13a is filtered by the filter (not illustrated) disposed therewithin, and the purified liquid is returned to the main flow passage adjacent to the sucking area 1b.

Thus, an intercepting stream flows circulatorily in the intercepting stream passage which is composed of the divergent pipe 13, the bearing 8, the concave portion 12b, the discharge pipe 13a and the filter, so that any impurities occurring from the bearing 8 as slidable means are prevented from being mixed with the main flow liquid in the interior of the casing 1.

Further, a part of the main flow liquid entered into the divergent pipe 11 is supplied into a rear end 1d3 of the rear casing 1d2 and subsequently into the rotor casing 1a2 by way of the plurality of grooves 8a formed on the outer surface of the bearing 8. Then, the flowing liquid cools the heated rotor R and is returned to the interior of the casing 1.

On the other hand, the liquid passes through the bearing 8 and then is mixed with the impurities occurring therefrom. Such contaminated liquid is supplied into the discharge pipe 13a and again returned to the main flow passage adjacent to the sucking opening 1b by way of the filter (not illustrated).

Since the intercepting stream to intercept the impurities flows into the intercepting stream passage composed of the divergent pipe 11, the plurality of grooves formed in the bearing 8 and the discharge pipe 13b, the impurities are prevented from being mixed with the main flow liquid in the interior of the casing 1.

A fourth embodiment of this invention will now be described with reference to FIGS. 4A, 4B and 4C. In this embodiment, a magnet pump is employed.

Figure 4A:
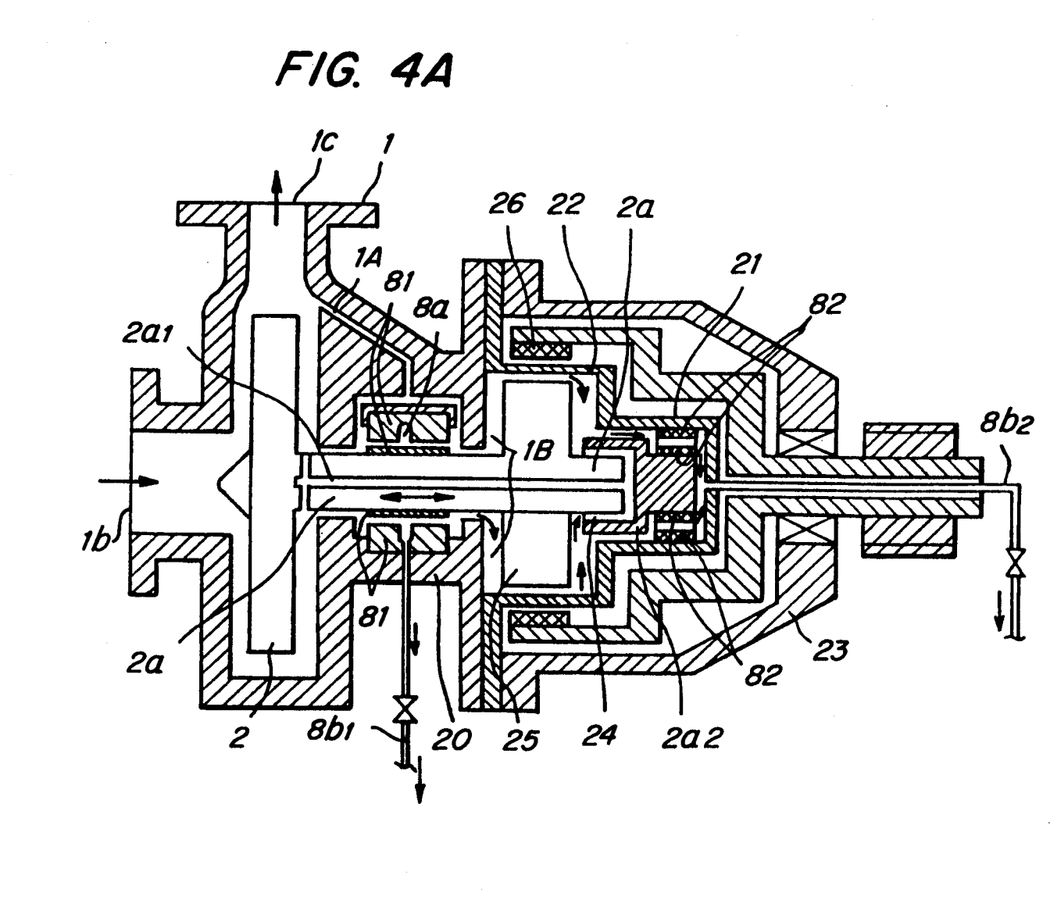
FIG. 4A is a section view according to a fourth embodiment of this invention.
Figure 4B:
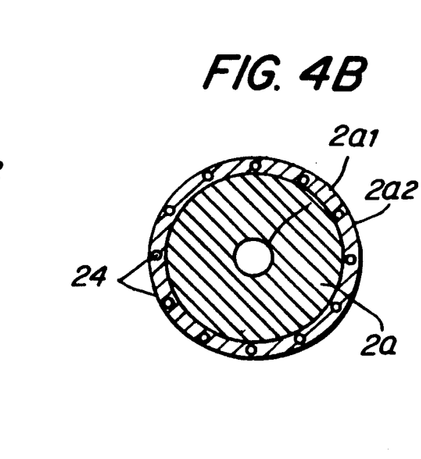
FIG. 4B is a section view of a socket in the forth embodiment.

In FIG. 4A, numeral 1A is a divergent passage formed in a front casing 20. The divergent passage 1A is connected to a front bearing 81 from the flow passage adjacent to 10 the discharge opening 1c.

Numeral 8a is an annular manifold groove formed inside the front bearing 81, in which the shaft 2a can be rotated. Numeral 21 is a rear casing integrally associated with a rotor casing 22. Numeral 2a2 is a socket mounted on the end of the shaft 2a. As shown in FIG. 4B, a plurality of grooves 24 are formed on the outer circumference of the socket 2a2.

Numeral 23 is a rear casing, numeral 25 is a rotor incorporated in a rotor casing 22 and numeral 26 is a magnet enclosing the rotor 25. Numeral 1B is a cooling channel associating front bearing 81 with a rear bearing 82.

Numeral 2a1 is a channel axially penetrated into the shaft 2a. Numeral 8b1 is a discharge pipe communicated with the manifold groove 8a. Numeral 8b2 is another discharge pipe connected to the end of the rear casing 21.

When the impeller 2 starts rotation, the main flow liquid is sucked through the sucking opening 1b and supplied toward the discharge opening 1c under a pressure application. A part of the liquid is supplied to the front bearing 81 by way of the divergent passage 1A. The liquid passes through a slight gap between the inner bearing fixed with the shaft 2a and the outer bearing, and is supplied to the manifold groove 8a. Then, the liquid is mixed with the impurities i.e. worn matters occurring from the bearing 81 as a slidable means, and such contaminated liquid is discharged from the discharge pipe 8b1.

The other liquid is supplied directly to the cooling channel 1B from the divergent passage 1A, and then to the rear bearing 82, cooling the rotor 25. Subsequently, the liquid passes through the interior of the rear bearing 82 disposed between the inner surface of the rear casing 21 and the outer surface of the socket 2a2. Then, the liquid is mixed with the impurities occurring from the rear bearing 82, and such contaminated liquid is discharged from the discharge pipe 8b2.

On the other hand, the liquid passing through the plurality of grooves 24 of the socket 2a2 without flowing to the rear bearing 82 is supplied to the channel 2a1 of the shaft 2a, and returned to the interior of the casing 1.

Figure 4C:
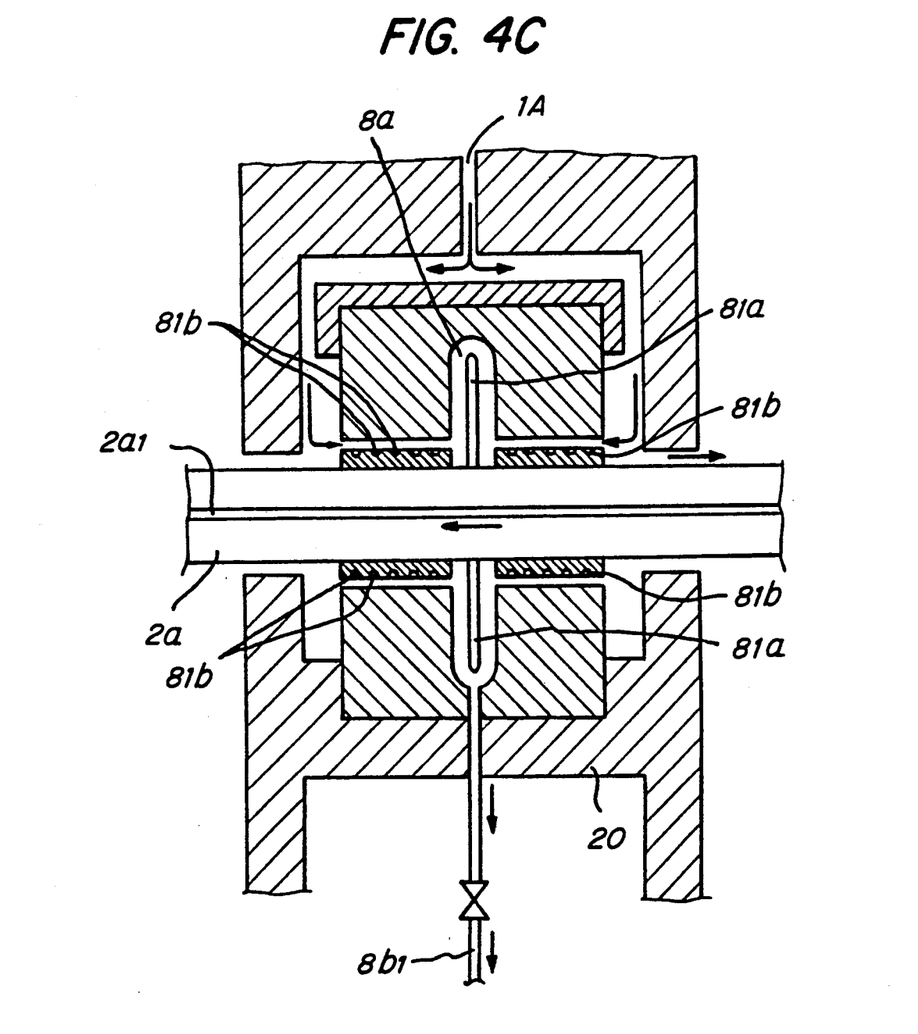
FIG. 4C is an enlarged section view of a front bearing in the fourth embodiment.

FIG. 4C shows an enlarged section view of the front bearing 81 and its surrounding, in which numeral 81a is an impeller disposed in the manifold groove 8a and fixed with the shaft 2a. Due to the rotation of the impeller 81a, the liquid supplied through the divergent passage 1A is efficiently discharged by way of the discharge pipe 8b1. Numeral 81b is a spiral screw thread formed on the surface of the bearing 81.

The aforesaid arrangement is of course applicable for the canned motor pump in FIG. 3A.

INDUSTRIAL APPLICABILITY

As discussed above, since the intercepting stream to intercept any impurities i.e. worn matters occurring from the slidable means such as bearings is formed in a slight gap between the casing of the rotary pump and the slidable means, the ultrapure liquid flowing in the interior of the casing is prevented from being mixed with any impurities. As a result, the ultrapure liquid can maintain its proper purity.

I claim:

1. A pump comprising:
    a casing;
    an impeller mounted on a shaft, said shaft being rotatably inserted into a cylinder connected to the casing;
    said casing having a suction opening for sucking in a main flow liquid and a discharge opening for discharging said main flow liquid in response to operation of said impeller;
    means in said cylinder for supporting a bearing;
    a bearing on said shaft disposed in the means for supporting a bearing spacing said shaft from said cylinder to form a gap;
    means for providing an intercepting stream of liquid between said impeller and said bearing on said shaft in said cylinder to substantially eliminate impurities caused by bearing wear from mixing with the flow liquid being discharged from the discharge opening; said means comprising:
        means for diverting flow liquid from said discharge opening to the gap between said cylinder and said shaft between said impeller and said bearing, and
        means for discharging the diverted flow liquid from said gap to substantially eliminate the impurities caused by bearing wear from mixing with the flow liquid during operation of said pump.

2. A pump as defined in claim 1 wherein:
    said means for discharging the diverted flow liquid from said gap comprises:
        a discharge passage having filter means, said filter means including a passage to return filtered liquid to the suction opening of said casing.

3. A pump as claimed in claim 1, in which an intercepting stream passage for intercepting said impurities is composed of an annular manifold groove formed on the inner surface of said cylinder, a screw thread means formed on the surface of said shaft of said impeller and positioned behind said impeller and before said manifold groove, and a discharge passage disposed in said manifold groove; thereby said intercepting stream flowing in the interior of said casing, said manifold groove by way of said screw thread means, and the discharge passage respectively.

4. The pump as defined in claim 1 wherein:
    said means for diverting flow liquid comprises a diverting passage in communication with said discharge opening; and
    a manifold groove formed on an inner surface of said bearing, said groove being in liquid communication with said diverting passage; and
    said means for discharging the diverted flow liquid mixed with impurities comprises:
        a discharge passage in liquid communication with said manifold groove for discharging the diverted flow liquid from said gap.

5. A pump according to claim 1, further comprising a stator coil in said cylinder placed around said rotor; and wherein said means in said cylinder for supporting a bearing comprises means for supporting two bearings, a front bearing on a front part of said shaft disposed in said means for supporting a bearing spacing said shaft from said cylinder to form a first gap, and a rear bearing on a rear part of said shaft disposed in said means for supporting said bearing spacing said shaft from said cylinder to form a second gap;
    first and second annular manifold grooves formed on the inner surface of said cylinder between said impeller and said front bearing and;
    said means for diverting flow liquid from said discharge opening comprises a main flow liquid diverting passage disposed between said discharge opening and said first manifold groove, said manifold groove being in liquid communication with said diverting passage and
    said means for discharging the diverted flow liquid from said first gap comprises
    means providing for the circulation of a part of the main flow liquid diverted through said diverting passage to said first manifold groove, said means including:
        a first discharge pipe disposed between said second manifold groove and said rear bearing in said cylinder rotatably mounting said shaft; and
        a second discharge pipe disposed between said first discharge pipe and said suction opening, said second discharge pipe being provided with filter means for removing impurities from the liquid conveyed through said second discharge pipe.

6. A pump, comprising:
    a casing;
    an impeller mounted on a shaft, said shaft being rotatably inserted into means for supporting said shaft in said casing and having a rotor;
    said casing having a suction opening for sucking in a main flow liquid and a discharge opening for discharging said main flow liquid in response to operation of said impeller;
    a stator coil in said casing and around said rotor;
    a front bearing disposed on a part of said shaft in front of said impeller;
    a rear bearing disposed on a part of said shaft, behind said impeller;
    a first intercepting means for providing an intercepting stream of liquid between said impeller and said front bearing to substantially eliminate impurities caused by front bearing wear from mixing with the flow liquid being discharged from the discharge opening, said first intercepting means comprising:
        a manifold groove formed on the inner surface of said front bearing;
        a main flow liquid diverting passage disposed between said discharge opening and said front manifold groove and
        a first discharge passage in liquid communication with said front manifold groove for discharging diverted flow liquid from said manifold groove to substantially eliminate the impurities caused by bearing wear from mixing with the flow liquid during operation of the pump; and
    a second intercepting means for providing an intercepting stream of liquid between said impeller and said rear bearing to substantially eliminate impurities caused by rear bearing wear from mixing with the flow liquid being discharged from the discharge opening, said second intercepting means comprising:

a main flow liquid diverting passage disposed between said discharge opening and said rear bearing;

a plurality of annular grooves on the outer surface of said rear bearing;

a manifold groove formed on the inner surface of said rear bearing; and a second discharge passage in liquid communication with said rear manifold groove for discharging diverted flow liquid from said rear manifold groove to substantially eliminate the impurities caused by bearing wear from mixing with the flow liquid during operation of the pump.

* * * * *